Figure 1:
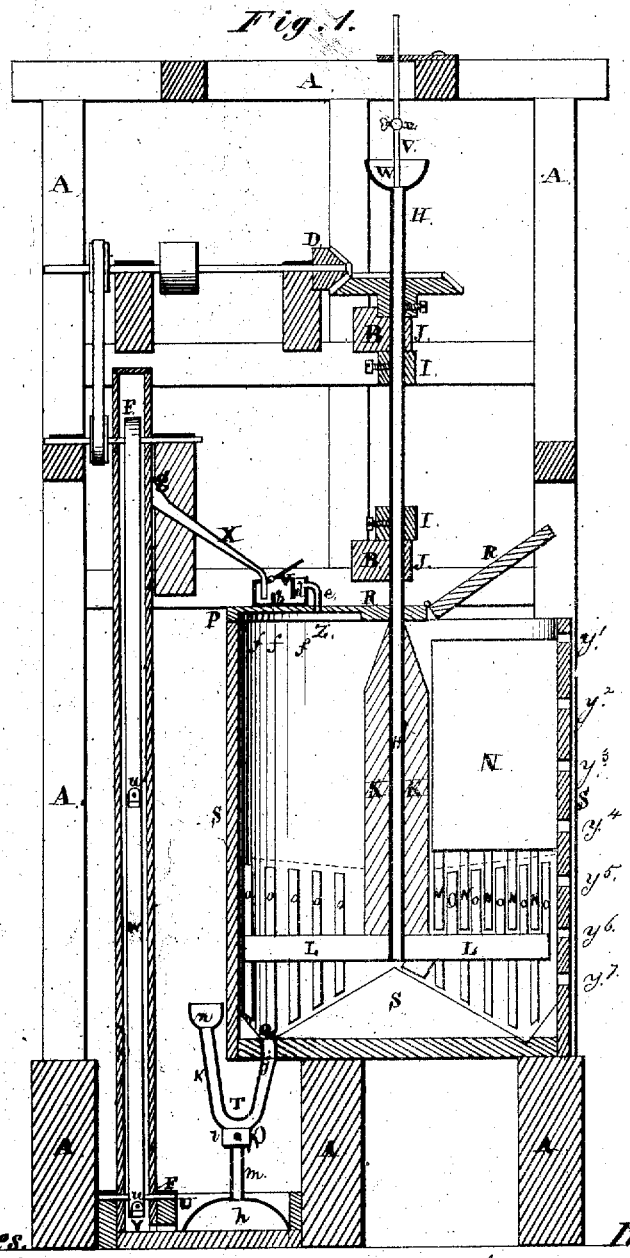

2 Sheets--Sheet 1.

A. B. CROSBY.

Improvement in Process and Apparatus for Amalgamating Gold and Silver.

No. 4,964. Reissued July 9, 1872.

Witnesses.

Jarvis Chaulden

Harry Coleman

Inventor.

Augustine B. Crosby;

by John J. Halsted his Atty

2 Sheets--Sheet 2.

A. B. CROSBY.

Improvement in Process and Apparatus for Amalgamating Gold and Silver.

No. 4,964. Reissued July 9, 1872.

*Witnesses.*

Jarvis Moulden

Harry Palmer

*Inventor.*

Augustine B. Crosby by John J. Halsted his Atty

UNITED STATES PATENT OFFICE.

AUGUSTINE B. CROSBY, OF GREENE, MAINE, ASSIGNOR, BY MESNE ASSIGNMENTS, TO THE CROSBY PATENT GOLD-AND-SILVER AMALGAMATING ASSOCIATION.

IMPROVEMENT IN PROCESSES AND APPARATUS FOR AMALGAMATING GOLD AND SILVER.

Specification forming part of Letters Patent No. 119,264, dated September 26, 1871; reissue No. 4,964, dated July 9, 1872.

*To all whom it may concern:*

Be it known that I, AUGUSTINE B. CROSBY, of the town of Greene, county of Androscoggin and State of Maine, have invented a new and Improved Method or Process for the Amalgamation of the Metals Gold and Silver, in order to effect their separation from their gangues, ores, or other associated material; and I do hereby declare that the following is a full and exact description thereof, reference being had to the accompanying drawing and the letters of reference marked thereon.

The nature of my invention consists in a novel method of treatment of prepared gold and silver ores, whereby the difficulties and loss attending the manipulation of pyritous or other base-metal ores by the present methods of amalgamation are overcome and prevented. The invention further consists in an apparatus, hereinafter described, adapted for practising such new method or process. In order to effect a thorough intermixture of the quicksilver and prepared ores, and to keep the quicksilver always in order and free from its own oxide, it is, substantially as hereinafter described, caused to circulate by being drawn from the bottom of the amalgamator as rapidly as it gathers; passed through a strainer; then elevated to a small tank, in which is placed a suitable quantity of amalgam of some of the alkaline metals; from thence it flows into a pipe placed radially in the top of the amalgamating-tub. This pipe is perforated with sufficiently fine apertures to discharge the quicksilver in a continuous shower upon the ore-pulp. In order to prevent loss in the form of fine particles of amalgam, which, by ordinary methods, are not gathered or aggregated so as to be separated from the ore-pulp, the material in the amalgamating-tub, after amalgamation has taken place, is diluted more or less, and submitted to the action of a current water in such manner that none of the fine amalgam shall be carried away, and until the fine particles of amalgam shall be cleaned, or the base metals oxidized so as to separate from them, when they will combine and form a mass at the bottom of the tub, from whence they are carried by the quicksilver to the strainer, substantially as hereinafter described. In order that success may not depend on the skill of workmen, and that the process may be cheaply performed, the duration of each step of the process may, by my method, be fixed, as well as the manner in which it is to be done; and these steps succeed each other in the order of perpetual continuity, and in such manner as to accomplish the object and leave nothing discretionary to the workman, substantially as hereinafter described.

To enable others skilled in the art to make and use my invention, I will proceed to describe the construction and operation of the machine proposed for its application.

Figure 2:
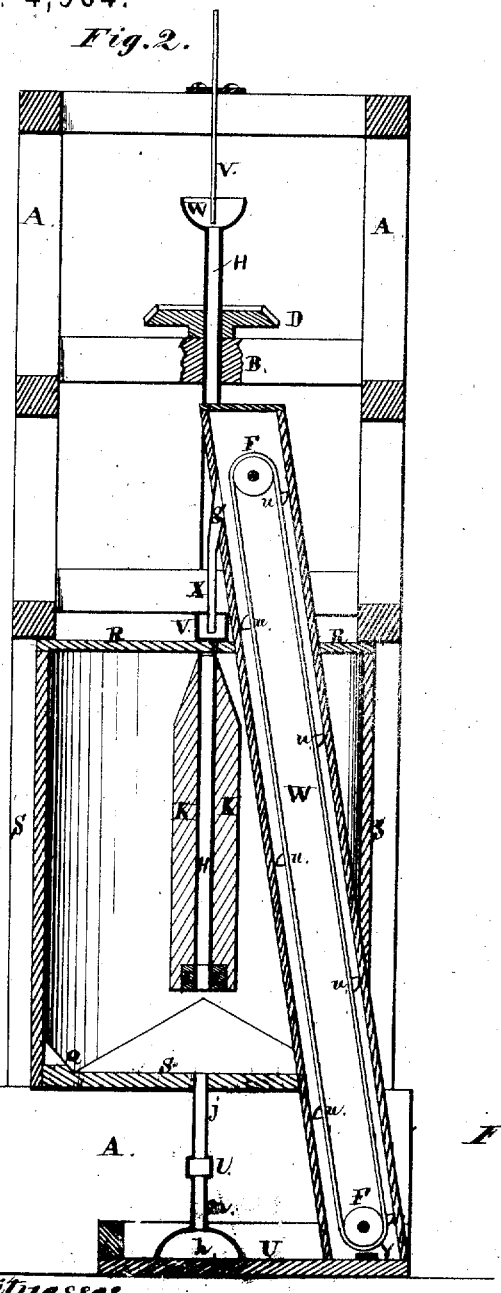
Figure 3:
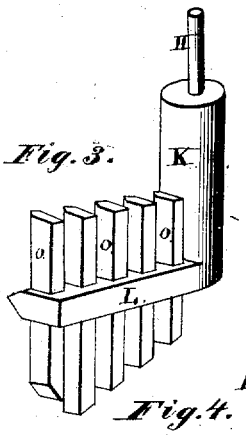
Figure 4:
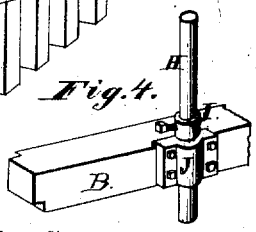
Figure 5:
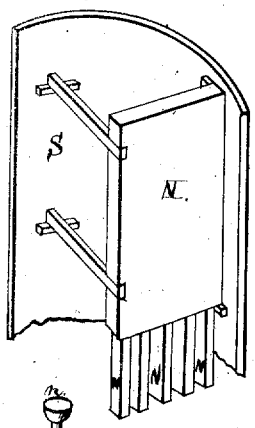
Figure 6:
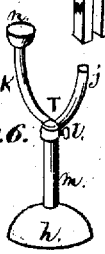

First, a circular tub of wood, bound with iron hoops, large enough for the amount of ore it is designed to work at one charge, and in height so that the top of the tub shall be at least twice as far from the ore-line as the ore-line is from the lowest point in the bottom of the tub. The bottom of the tub is made so as to form a cone, the base of which terminates six inches, more or less, inside the tub-staves. Around the base of this cone is made a groove two inches wide and one inch deep, more or less. Outside, and from the edge of this groove, the bottom of the tub is made to rise at an angle of about sixty degrees to the tub-staves, as shown in Figs. 1 and 2 of the drawing, S S showing sections of the sides and bottom of the tub; R R, the top of the tub, covering it close when the lid is closed. The ore is stirred and intermixed with the quicksilver by means of wooden stirrers. L O O O show a section of them in Fig. 1, and a perspective, in part, in Fig. 3. These stirrers are attached to a wooden cylinder about one foot in diameter, and extending up to nearly two inches below the top of the tub, as shown in section by K K of Figs. 1 and 2, and in perspective, in part, by K of Fig. 3. The shaft that sustains and drives these stirrers is a hollow iron pipe, three inches, more or less, in diameter, that extends from the bottom of the stirrer-frame L, through K K, to the bowl *w*, as shown by H H, in section, Fig. 1, and in perspective, in part, by H in Fig. 3. This shaft-pipe is held in place by, and runs in boxes attached to, wooden beams, as shown by B B, Fig. 1, and B, Fig. 4, the boxes being indicated by J J J of the same figures. Fig. 4 shows, in perspective, the beam B, a part of the shaft-pipe H, the box J, and the collar I, that runs with the shaft-pipe and on the end of the box J. The shaft-pipe and stirrers are driven by means of gear, as shown by D D, Fig. 1. The shaft-pipe terminates in a bowl, as shown by *w*, Fig. 1, the object of which is to prevent the spattering of water from the pipe *v*, as shown in Fig. I. This pipe connects with a tank, not shown. Of the same figure, *x* is a stop-cock to regulate the supply of water. N N N, Fig. 1, show a fixed wing or partition with arms *n n*, so attached that they cut the spaces between the arms O O O, and extend nearly to the cross-piece L of the stirrers, so that when the stirrers are revolving all caking or banking of the ore on the top of the cross-piece L shall be prevented. The partition is placed on a radial line from one-half inch, more or less, from the wooden cylinder K K to the tub-staves, so that when the ore-pulp is diluted and the tub filled with water the circular motion caused by the stirrers shall be stopped and its surface made quiet, in order that all material specifically heavier than the water may settle to some distance below the discharge $y^1$, as shown in Figs. 1 and 5. The apertures $y^1$ $y^2$ $y^3$, &c., are discharge-points opened at different stages of the manipulation. T is a mechanical arrangement for drawing the quicksilver from the groove Q in the tub bottom, and straining it before elevation, as shown in Fig. 1 in section, and in perspective in Fig. 6. The pipe *k* and the bowl *n* extend high enough to balance the pressure of quicksilver in the pipe *j* as high as the top of the groove Q, added to the water pressure when the tub is full. The stop-cock *l*, or a sliding pipe, or other device regulates the flow of the quicksilver, and the pipe *m* discharges it directly into the straining-bag *h*. U is a tank of sufficient size to hold all the quicksilver being used, of such form that the surface of the quicksilver shall not rise up to the shaft of the pulley F of the elevator, and communicates from its bottom with the space Y of the elevator, substantially as shown in Figs. 1 and 2. F F are pulleys of a belt and cup-elevator, W being the belt and *w w w* the cups, as shown in Figs. I and 2. The hopper *g* receives the quicksilver from the elevator, and discharges it through the pipes X into the tank V, as shown in Figs. 1 and 2. V is a tank, four by six by twelve inches, more or less, in dimensions, that receives the quicksilver near its bottom *o* from the pipe X, from whence it flows over a small partition into the middle chamber *b*, in which is placed some reducing agent, like the alkaline metal amalgams; from thence it passes under the partition *d*, through a small chamber, to the pipe *e*, as shown in Fig. 1. The pipe Z is placed in the top of the tub radially and pierced with fine holes or slots; it has a plug, P, to be removed when cleaning is necessary. The quicksilver is received into the pipe Z from the pipe *e*, and discharged through the holes or slots in fine streams into the ore-pulp, substantially as shown in Fig. 1.

The operation of the machine and application of the principles involved in my method or process are as follows: A motion of about twenty revolutions per minute is given to the stirrers; then water is admitted to the tub through the hollow shaft H H in quantity sufficient to make a pulp of the ore-charge that will barely flow from a ladle; then the finely-ground ore is admitted for the charge of one ton, more or less, or so that the charge shall reach just above the stirrers; then three hundred pounds, more or less, of quicksilver having been placed in the tank U the circulation of the quicksilver is started by giving motion to the elevator; it is discharged from the elevator into the tank V, in which is placed some sodium, or other alkaline metal amalgam, for the purpose of reducing the oxide of quicksilver that is formed and absorbed by using in contact with air or other oxidizing material, and putting it in positive condition to act. The pipe Z discharges the quicksilver, as rapidly as it is received from the tank V, through its holes or slots, in fine streams *f f f*, into the ore-pulp. In a short time the ore-pulp becomes thoroughly charged with fine globules of quicksilver that gradually gather in mass at the bottom in the groove Q, from whence it is carried by its own weight and forced through the strainer *h* into the tank U; from thence it flows to the elevator, and is carried through the same changes as before. This action of the quicksilver is kept up about three hours, more or less, if the ore demands it, to complete the amalgamation. After the amalgamation is completed the ore-pulp is diluted by water admitted through the shaft-pipe H H until the tub is filled to the discharge-point $y^1$. In this condition the running is continued about one hour, when all the material specifically heavier than the water will have settled to some depth in the amalgamating-tub. At this period a current of water is admitted through the shaft-pipe H H so as to about one-half fill the discharge $y^1$. The action of this current is kept up until the amalgam particles shall have "gathered." The object of this action of the water is to remove entirely the base metals from the fine amalgam particles, the films from which prevent the particles from uniting when they come together, so that the amalgam may be readily collected. The free oxygen in the water is believed to be the agent of this action. After running until the amalgam is about collected by the water action last described, open the discharge $y^2$ and run about one-half hour; then open the discharge $y^3$ and run about one-half hour; and so on for each discharge; and on the completion of the last discharge all the discharge-points are closed except $y^1$, and the water is shut off so as to leave the necessary quantity for a new charge of ore—the amalgamating-tub being now ready for it—no further cleaning up being necessary in continuous work.

What I claim as my invention, and desire to secure by Letters Patent, is—

1. The continual straining, circulation, and renovation of the quicksilver while in active use, and the washing of the ore-pulp, so that the action of the free oxygen, or other agent or agencies pertaining to or contained in the water, may be obtained upon the particles of amalgam, to purify and make them easily collected, and in such manner that but a small amount shall be lost during the collection, substantially as hereinbefore described.

2. I also claim the combination in apparatus for the amalgamation of gold and silver, of means for showering quicksilver upon the pulp, means for intermixing it with the pulp, means for straining it as it leaves the pulp, and means for elevating it to a tank, in which is a deoxidizing agent, to fit it to be again discharged into the pulp, the combination being substantially as described.

AUGUSTINE B. CROSBY.

Witnesses:
H. S. LANSING,
G. A. H. ROSE.